Patented Jan. 9, 1951

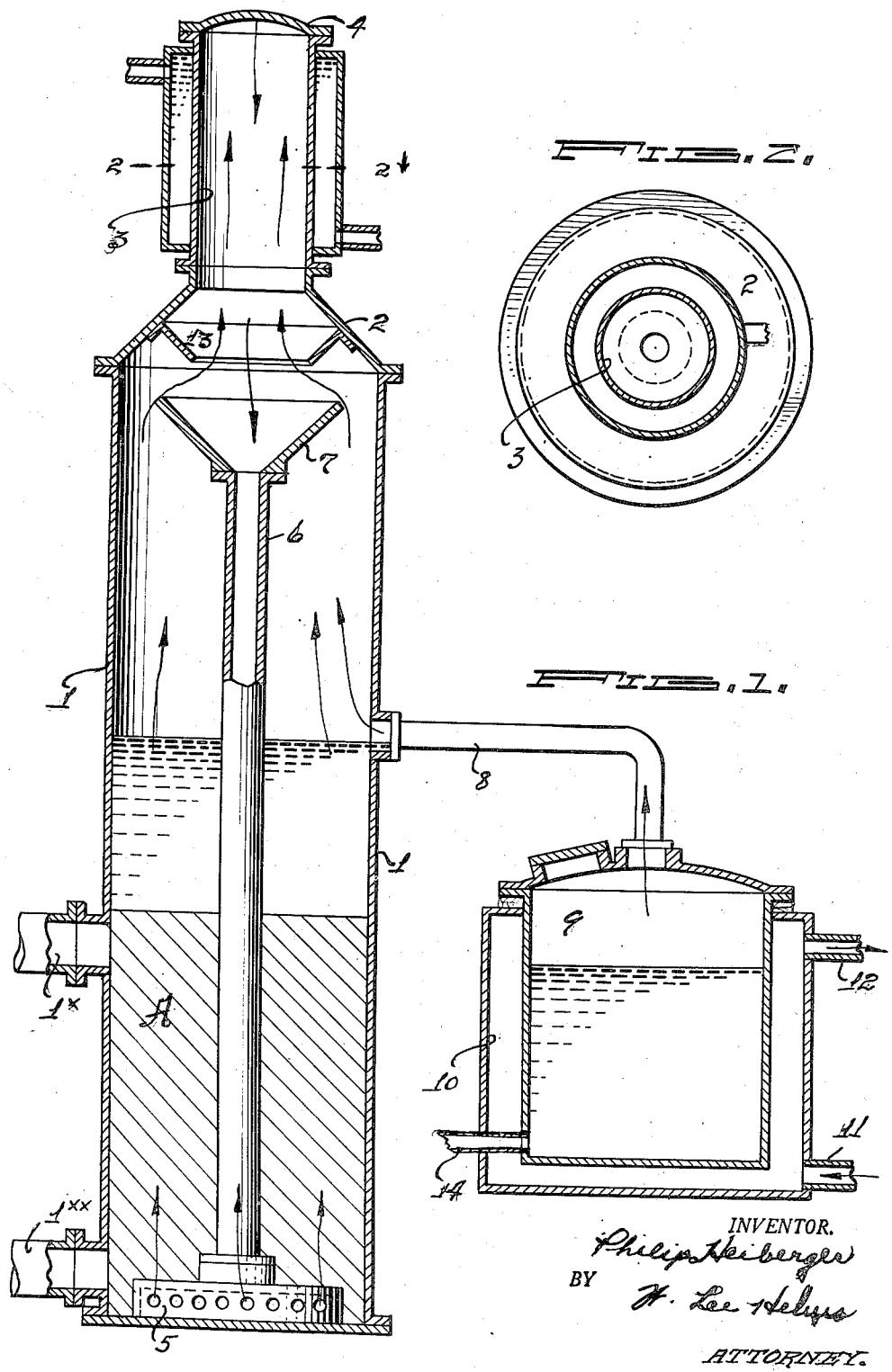

2,537,134

UNITED STATES PATENT OFFICE 2,537,134

METHOD FOR PRODUCING MALEIC ADDUCTS

Philip Heiberger, Brooklyn, N. Y., assignor, by mesne assignments, to American Chicle Company, Long Island City, N. Y., a corporation of New Jersey Application August 16, 1946, Serial No. 691,147

3 Claims. (Cl. 260—342.4)

The present invention relates to the production of improved resinous products through the reaction of maleic anhydride or its equivalent and unsaturated fatty acids. The reaction products of maleic anhydride and unsaturated fatty acids have recently attracted much attention. Because China-wood oil contains elaeostearic acid, an acid with conjugated bonds, this oil was first studied. The normal Diels-Alder reaction is a condensation between a conjugated double bond and and an enal group such as is present in maleic anhydride. It was found that wood oil reacts rapidly with maleic anhydride at temperatures in excess of 125° C. There are a number of patented processes describing the reaction of maleic anhydride with substances containing elaeostearic acid.

Within the last ten years, it has been found that a similar reaction takes place between maleic anhydride and vegetable oils containing non-conjugated fatty acids. In such cases it is naturally necessary that the non-conjugated compounds are converted into conjugated compounds prior to inducing the reaction. High temperatures are needed (above 180° C.) to effect the Diels-Alder condensation in such cases.

In the known processes only a limited proportion of the fatty acids present in vegetable oil combinations are capable of reacting with maleic anhydride. Even at 180° C. or higher temperatures, the Diels-Alder reaction is limited to conjugated double bonds and to non-conjugated double bond systems capable of forming conjugated systems. Therefore, oleic and saturated fatty acids as well as unsaponifiable materials are incapable of being reacted with maleic anhydride. It is definitely established that the fatty acids from soya bean oil, corn oil, linseed oil, cotton seed oil, etc., often contain as much as, or more than 50% oleic and unsaturated fatty acids. Consequently, following the procedures taught in the previous publications, the so-called adduct is a mixture of the desired condensate, 1-alkyl-4-alkyl tetrahydrophthalic anhydride, with unreacted linoleic acid, oleic acid, saturated fatty acids, unsaponifiables and maleic anhydride.

The desirable active ingredient in the adduct is 1-4-TPA, which has a theoretical acid number of 450. The adducts reported in the patent literature vary from 200–300. Since the acid member of the unreacted fatty acids have an acid number of approximately 180, the adducts previously reported are actually crude mixtures.

The condensation products from the fatty acid mixture and maleic anhydride are readily soluble in most organic solvents including the aliphatic and aromatic hydrocarbons. If the condensate were truly a tricarboxylic acid, it should be soluble with difficulty in hydrocarbon solvents such as petroleum ether. One therefore should expect that a selective extraction with a hydrocarbon solvent would specifically remove the monocarboxy acids leaving the triacid as a residue. This is not the fact, however, because the product as a whole goes into solution in most hydrocarbon solvents. There is one exception to this condition, i. e., where beta elaeostearic acid is used in the adduct. Thus, in tung oil, the conjugated double bond proportion is about 85% and the Diels-Alder reaction is readily carried out at low temperatures.

When, therefore, an attempt is made to remove the uncondensed fractions from the true adduct by use of hydrocarbon solvents, it is found that the entire mass goes into solution. It is the specific purpose of my invention to so operate with certain hydrocarbon solvents that this result is overcome. A probable reason for the existence of the problem is that the uncondensed fractions are of themselves excellent solvents and in conjunction with the added hydrocarbon solvent, effect the total solution.

The characteristic of my method is the selective extraction from the true adduct constituent of the unreacted oleic and other fractions by passing the hydrocarbon solvent or solvents upwardly through the adduct mass contained within a column and in such manner that the major proportion of uncondensed constituents is picked up by the solvent and immediately removed from the column. When this is done the mass becomes resistant, as to solution, to the hydrocarbon solvent in ratio to the amount of unreacted materials thus extracted. Therefore, my method preferably contemplates the initial use of a hydrocarbon solvent relatively inert to the true adduct and which may be a low boiling aliphatic hydrocarbon, such as petroleum-ether, ligroin, hexane, heptane, octane, and the like. This may be followed by the use of more reactive solvents, such as one or a plurality of aromatic hydrocarbons such as benzene, toluene, xylene, or high boiling petroleum solvents, such as petroleum-ethers, naphthas or other aliphatic hydrocarbons. Generally, oxygenated solvents such as the acids, esters, aldehydes, ketones, and alcohols are excluded.

*Example I*

Condense 280 parts soya bean fatty acids with 98 parts maleic anhydride. Heat at 200° C. for three hours. The adduct thus obtained is a cloudy, viscous liquid, having an acid number = 271.

Using a glass laboratory type liquid-liquid extractor, the adduct was extracted with 90–100° C. petroleum ether until the petroleum ether came over clear. The residue was a clear brown semi-solid having an acid number = 351.

This adduct of acid number 351 was then dispersed in benzene. On standing the adduct settled out. The benzene was decanted and a fresh charge was added. On the third addition, the benzene remained substantially colorless.

Upon decantation and subsequent drying, the adduct was separated as a hard, brittle, readily pulverizable dark brown resinous solid. This product was odorless and had an acid number of 436. The resin melts at approximately 60° C.

Note that the benzene extraction can only be carried after the petroleum ether extraction since the initial product is completely miscible with benzene.

Example II

Take 280 grams linseed fatty acids, 98 grams maleic anhydride and heat three hours at 200° C. (Acid No. of fatty acid = 204.0, acid No. of adduct = 303.5.)

The adduct was extracted with 60–90° C. petroleum ether in a liquid-liquid extractor. The acid number of the petroleum ether extracted adduct = 357.0. The fatty acids carried along with the petroleum ether had an acid number of 212.2.

Example III 280 grams dehydrated castor oil fatty acid and 98 grams maleic anhydride were heated for three hours at 180–220° C. The acid No. of adduct = 315. The adduct was added to a large excess 30–60° petroleum ether in a separatory funnel. The adduct, when separated from the petroleum ether, had an acid No. of 363.

Example IV

Eighty-seven grams of fatty acids derived from marine oils, comprising mainly unsaturated 20-carbon acids, were subjected to 28 grams of maleic anhydride under heating for 2 to 3 hours, at 190° C. The acid number is given at 184.

The adduct is cloudy and it was filtered through cheese cloth to remove the sediment. After the filtration, the adduct was washed with water to remove the remainder of the unreacted anhydride and then extracted with 60–90° petroleum ether. The petroleum ether extraction was followed by a benzene wash. The residue was clear, brown, semi-solid having only a faint trace of the fish oil odor. The acid No. of this material was 378.

Depending upon the 1–4 TPA content of the adduct, there are several procedures for extracting the fatty acids from the adduct. If the initial content of the 1–4 TPA is high such as in the adducts of linseed or dehydrated castor oil, one may mix the adduct with hot solvent; on washing the 1–4 TPA will precipitate out and the solvent may be decanted along with the fatty acids. The adduct may also be dissolved in an aromatic solvent such as benzene and the solution then poured into a container of aliphatic hydrocarbons such as the mixed heptanes. The 1–4 TPA will precipitate out. A separatory funnel may be used on a small scale to effect satisfactory separation.

On the other hand, if the 1–4 TPA content is low such as a soya bean adduct, greater precautions must be taken. The use of the upflow extractor must be used.

Example V

An adduct of linseed oil fatty acids and maleic anhydride was prepared having an acid number of 327. The adduct was dissolved and mixed with ¼ its weight of benzene. One part of the solution was then added to a beaker containing a 5 fold volume of petroleum ether (90–100° C.). The crude 1–4 TPA precipitated out. The acid number of the precipitated adduct was 374.

In the drawing I have shown in Figure 1, and schematically, a suitable type of extraction apparatus, the figure being in vertical cross section; and Figure 2 is a section taken on the line 2—2 of Figure 1.

In the drawing, which illustrates a counter-current extraction apparatus, a column 1 is employed, the column having a conical header 2 open at its top and flanged to receive the flanged lower end of a condenser which consists of an annular water jacketed member 3, closed at its top by a plate 4, although the latter is not essential when member 3 is elongated. Within the column at its base is a manifold 5 having a plurality of apertures for the outward passage of condensed solvent, and this solvent is fed to the manifold through a tube 6 having a conical collector 7 at its top.

The adduct indicated at A may be passed into the column 1 in any desired manner, an inflow conduit being shown at 1x and an outflow conduit at 1xx. The adduct area of the column should in actual practice be steam jacketed. The solvent passes upwardly through the adduct and reaches a level at a pipe 8 through which the overflow passes to a vaporizer consisting of a vessel 9 which, in the present embodiment, is provided with a steam jacket 10 to which steam is admitted through pipe 11 and from which vapor may be passed through pipe 12.

In the operation of the apparatus, hot solvent condensed at the top of the column is discharged through pipes 6 into the manifold and the hot liquid solvent passes upward through the adduct, thence rises to pipe 8 and flows back into the vaporizer. From the vaporizer, the solvent vapors rise, and they may be caused to have an impeded path to the condenser through the use of a baffle 13 in the form of a frusto-conical shape. The member 13 also facilitates passage of the condensate to the collector 7.

Thus, the solvent may be recycled through the adduct until all of the unwanted fractions are picked up by the solvent and carried to the vaporizer, the solvent being continuously distilled off, condensed, and fed to the base of the adduct for recirculation. When the adduct is sufficiently purified, it is withdrawn and a fresh batch inserted. The extracted material may be withdrawn from the vaporizer, viz., pipe 14.

Having thus described my invention, what I claim and desire to secure by Letters Patent, is:

1. A process for selectively extracting the uncondensed fraction from an adduct mixture, said adduct mixture resulting from reacting maleic anhydride with fatty acids, which consists of the steps of passing a relatively low boiling hydrocarbon solvent selected from the group consisting of petroleum ether, ligroin, hexane, heptane and octane and upwardly through an adduct mass contained within a column, said solvent being passed through said column until a major portion of said uncondensed constituents is absorbed by said solvent and removed thereby, the step of subjecting the remaining adduct constituents to the action of a second and higher boiling hydrocarbon solvent selected from the group consisting of benzene, toluene and xylene, and the step of precipitating and recovering the undissolved fraction comprising the adduct, which consists of 1-alkyl, 4-alkyl tetrahydrophthalic anhydride.

2. A process according to claim 1 for removing the uncondensed fraction from an adduct mixture obtained by means of reacting maleic anhydride with vegetable oil fatty acids, which consists of the steps of passing a hydrocarbon solvent from the group of compounds consisting of ligroin, hexane, heptane, and octane, the said solvent being passed through said column until a major portion of said uncondensed constituents is absorbed and removed thereby, the step of subjecting the remaining adduct constituents to the action of a second solvent, selected from the group of compounds consisting of benzene, toluene and xylene, and the step of precipitating and recovering the undissolved fraction consisting of the adduct which consists of 1-4 tetrahydrophthalic anhydride.

3. A process for the treatment of an adduct mixture resulting from the interreaction of maleic anhydride with a substance consisting of unsaturated and saturated fatty acids such as linoleic and linolenic acid, which consists of the steps of passing a hydrocarbon solvent selected from the groups of compounds consisting of ligroin, hexane, heptane and octane, until a portion of the uncondensed constituents is picked up by said solvents and removed thereby, the step of subjecting the remaining adduct constituents to the action of a more reactive solvent selected from the group of compounds consisting of benzene, toluene and xylene, and precipitating and recovering the undissolved fraction of the adduct.

PHILIP HEIBERGER.

REFERENCES CITED

The following references are of record in the file of this patent:

UNITED STATES PATENTS

| Number | Name | Date |
| --- | --- | --- |
| 2,188,882 | Clocker | Jan. 30, 1940 |
| 2,188,886 | Clocker | Jan. 30, 1940 |
| 2,374,381 | Root | Apr. 24, 1945 |
| 2,423,234 | Gerhart et al. | July 1, 1947 |